Aug. 30, 1932.  G. W. McCHESNEY, SR., ET AL  1,874,779
TREE GUARD
Filed May 31, 1930
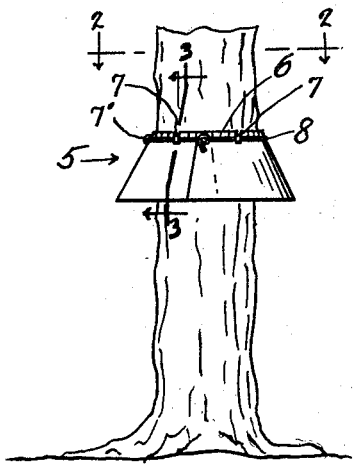
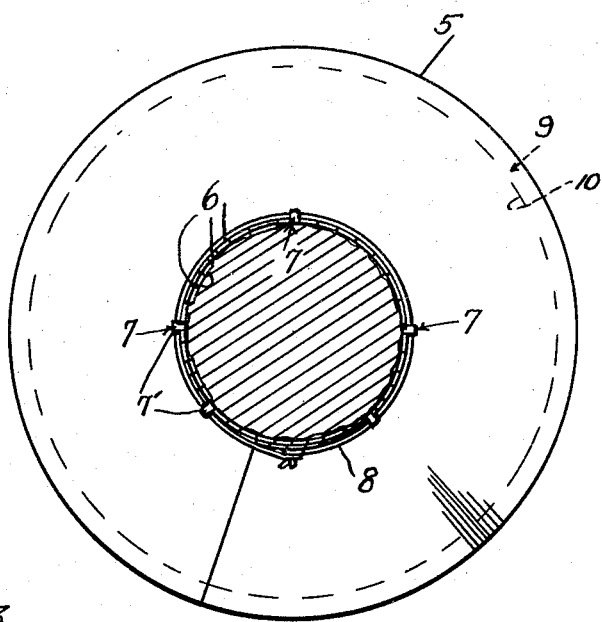
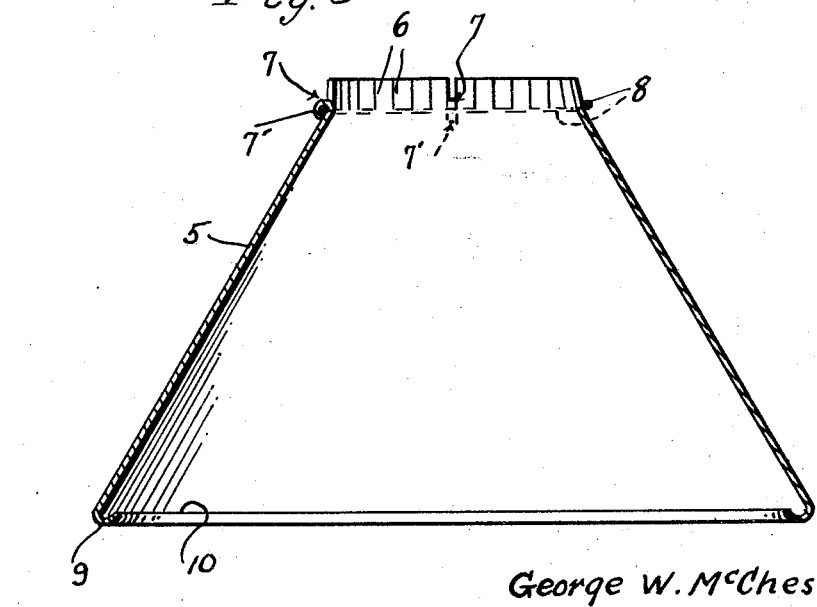
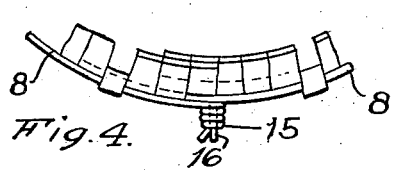
Inventors
George W. McChesney, Sr
Maxwell C. Northup
By L. B. James
Attorney Patented Aug. 30, 1932

1,874,779

UNITED STATES PATENT OFFICE

GEORGE W. McCHESNEY, SR., OF ROUSES POINT, AND MAXWELL C. NORTHUP, OF OGDENSBURG, NEW YORK

TREE GUARD

Application filed May 31, 1930. Serial No. 458,457.

This invention relates to guards and more particularly to tree guards.

The primary object of this invention resides in the provision of a tree guard adapted to protect the foliage of trees from attack by destructive insects, worms and the like.

Another object of this invention resides in the provision of a tree guard adapted to prevent tree climbing animals from climbing trees so equipped with the guard and thus prevent their attack upon song birds and their nests.

A further object of this invention resides in the provision of a tree guard adapted to prevent a tree climbing animal from passing therebeyond without injury by coming in contact with the guard.

A still further object of this invention resides in the provision of a tree guard of such structure that irregularities in the trunks of trees can be closed against passage of insects and the like beyond the guard.

In addition to the foregoing objects, this invention resides in the provision of a tree guard adapted to trap insects and the like should they endeavor to crawl over the same.

Included among the objects of this invention is the provision of a tree guard of such construction that growth of a tree will not be retarded through choking it at the point of attaching the guard thereto.

With these and other objects in view, this invention resides in certain novel features of construction, arrangement and combination of parts, to be hereinafter set forth in the specification, pointed out in the claim, and illustrated in the accompanying drawing, and, while this disclosure depicts our present conception of the invention, the right is reserved to resort to such variations in construction as fall within the scope of the claim.

In the accompanying drawing forming a part of this application,

Fig. 1 is a side view of a portion of a tree showing a guard attached thereto.

Fig. 2 is an enlarged, horizontal, sectional view thereof on line 2—2 of Fig. 1.

Fig. 3 is an enlarged vertical sectional view on line 3—3 of Fig. 1.

In the present embodiment of this invention, the numeral 5 designates a tree guard which preferably consists of a sheet of metal and so as to assume a substantially conical shape when folded around the trunk of a tree. This tree guard has its smaller circumferential edge slit so as to provide a multiplicity of flanges 6 and at certain points throughout the area so slit other flanges 7 of lesser width are provided.

The flanges 6 are adapted to fill depressions and conform to other irregularities in the trunks of trees so as to prevent insects and the like from passing beyond the guard.

Suitably secured adjacent one end of the guard, in close proximity to the slit edge thereof, is a string of wire 8, the same being adapted to be wrapped around the guard when folded around the trunk of a tree so as to fasten the guard to the tree and allow the guard to expand or unfold gradually as the tree grows. In order to retain the free ends of the aforesaid wire 8 in engagement whereby slippage may occur under strain, one terminal designated 15 is wound around the other terminal 16 as illustrated in Figure 4. This string of wire is retained in its initial relation to the slit edge of the guard by the flanges 7 which are bent over the same to form loops 7'.

The aforesaid slit edge of the guard is of a smaller diameter than the opposite edge and therefore, upon being wrapped around the trunk of a tree, forms a flared barrier under which insects and the like endeavor to pass toward the foliage of the tree. Formed around the lower, or flared end of the guard is an inturned flange 9 adapted to form an annular trough 10 to catch or retain a sticky substance coated on the inner surface of the guard.

With a tree guard of this structure wrapped around the trunk of a tree, the growth of the tree will not be retarded and through the instrumentality of the upper flanges, insects and the like will be prevented from crawling past the guard at hollow places while the sticky coating on the under surface and in the trough will prevent their passage over the guard. Further, the lower inturned flange will prevent injury to pet cats should they endeavor to climb around the guard.

Having thus described the invention, what is claimed is:

A tree guard of the character set forth comprising a substantially inverted conical body portion having overlapping ends, flanges on the smaller edge thereof, loops between certain of the flanges, a string of wire fastened at one end to the body portion and passing through the loops and across the space between the flanges adjacent the loops, means frictionally anchoring the free end of the wire, and an inturned arcuate trough directed inwardly at the larger end of the body portion.

In testimony whereof we affix our signatures.

GEORGE W. McCHESNEY, Sr.
MAXWELL C. NORTHUP.